Patented July 29, 1952

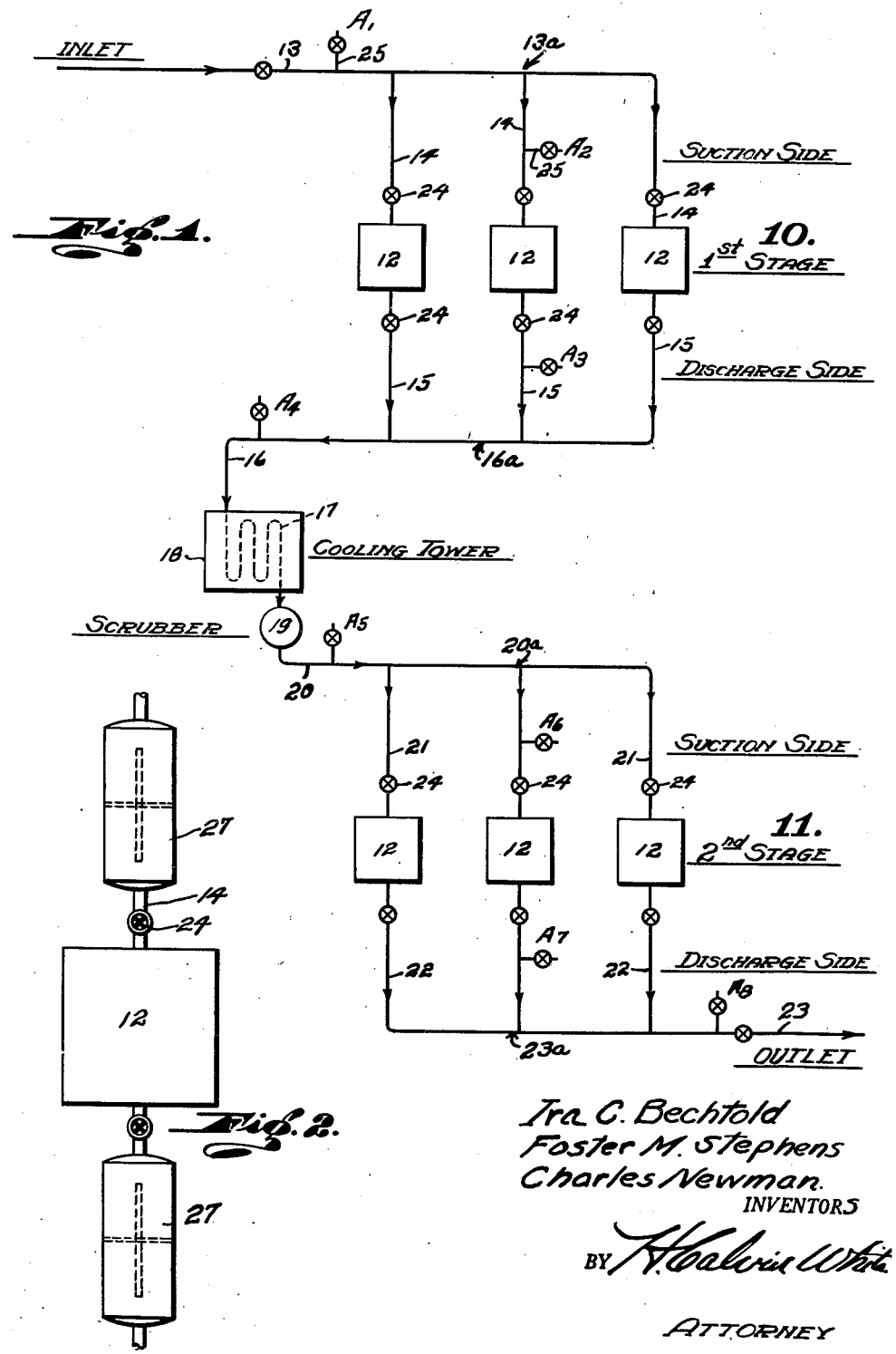

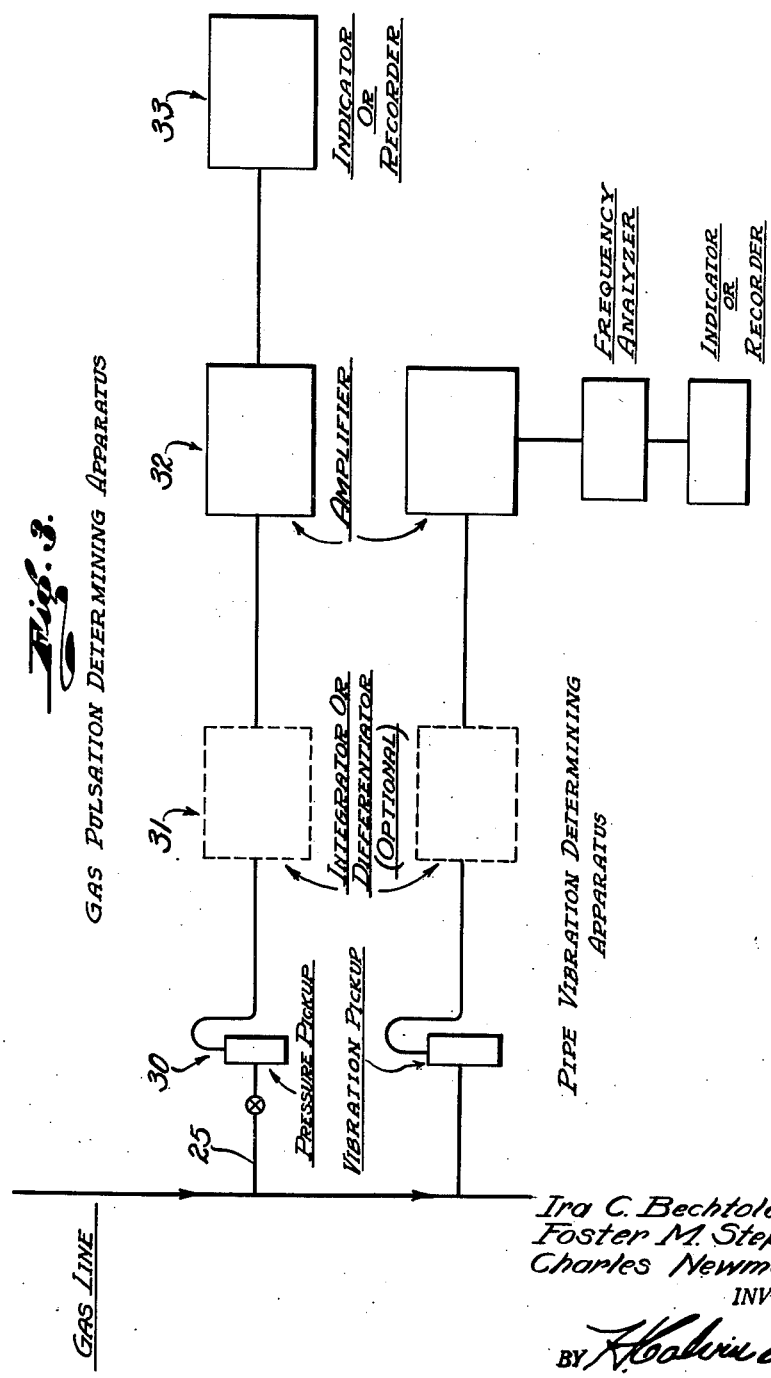

2,604,781

UNITED STATES PATENT OFFICE 2,604,781

DETERMINATION AND CORRECTION OF VIBRATIONS IN GAS COMPRESSOR LINES

Ira C. Bechtold, Whittier, Foster M. Stephens, Los Angeles, and Charles Newman, Hollywood, Calif., assignors to The Fluor Corporation, Ltd., Los Angeles, Calif., a corporation of California Application September 28, 1946, Serial No. 700,040

6 Claims. (Cl. 73—70)

This invention has to do with the determination of causes for vibrations in conduit or piping systems for gas compressors, and the elimination of such vibrations when found to be created by the pulsating flow condition of the gas. Particularly the invention is concerned with those conduit systems, customarily existing in natural gas compressor plants, comprising a gas line including a header section, and individual pipe connections between the header and a plurality of piston type compressors.

Extended or individual portions of the conduit system frequently are found to vibrate excessively or to degrees necessitating elimination of the vibrations for noiseless and safe operation. It has been determined that physical or bodily vibrations of the conduit may be caused by either or both the pulsating flow of the gas, and mechanical sources such as vibrations of the compressors themselves and which are transmitted through their connections with the conduit system.

The general object of the invention is to provide improved methods for determining the source or cause of the vibration, in a manner permitting differentiation between gas pulsation-created vibrations and those resulting from transmitted mechanical vibrations, to the end that the condition may be corrected by definite knowledge of the offending source. And as indicated, where the vibrations are caused by the pulsating condition of the gas, the invention affords fully effective means for substantially eliminating that cause.

The method contemplated by the invention involves making determinations of both the gas pulsations and bodily vibrations of the conduit at selected and preferably corresponding locations in the conduit system, to obtain comparative measurements indicative of the cause of the pulsations. One preferred procedure is to make the gas pulsation determinations while variably restricting the gas flow to produce, by virtue of such restriction, variations in the magnitude of the pulsations, and measuring the conduit vibrations under the same conditions. Where, for example, such vibrations are found to diminish as the gas pulsations are reduced, it is established that the vibrations are caused by the pulsations and can permanently be eliminated by correcting the flow condition of the gas. On the other hand, where the conduit vibrations are found to persist despite variation of the pulsation characteristics, then it is indicated that the correction must be made by physically stabilizing the conduit or eliminating a primary source of vibration.

The invention further contemplates, in conjunction with these determinations of the cause of vibration, the elimination of pulsations at locations in the system which, as such determinations show, will assure correction of the vibration. Generally it will be found preferable to eliminate the pulsations at locations within one or more of the branch connections between the compressors and header, although instances may arise when it may be advantageous to eliminate the pulsations in or beyond the header.

The various features and objects of the invention, as well as the more particular aspects of a typical problem and installation, will be understood to better advantage from the following description of the accompanying drawing, in which:

Fig. 1 is a diagrammatic illustration of the gas conduit or piping system in a typical two-stage compressor plant;

Fig. 2 is a view showing the installation of pulsation dampeners in the suction and discharge branch connections with an individual compressor; and Fig. 3 is a diagrammatic illustration of the gas pulsation and pipe vibration recording instruments.

The two compression stages, generally indicated at 10 and 11, individually may contain any suitable number of compressors diagrammatically indicated at 12, three in each stage being shown as illustrative. Gas at a pressure for example of 100 p. s. i. is taken into the system from the inlet line 13 which may have a header section 13a of any suitable form or design, connecting by way of the branch lines 14 with the first stage compressors 12. The gas compressed to say 300 p. s. i. is discharged by the compressors through branch pipes 15 into the header section 16a of line 16. Before entering the second stage, the gas may be cooled by passage through the conventional coil 17 in cooling tower 18, and thence through scrubber or separator 19 within which any condensate is removed from the gas.

Leaving the separator, the gas flows through line 20 and its header section 20a to be supplied through the laterals 21 to the second stage compressors. The latter discharge the gas at a pressure of say 900 p. s. i. through laterals 22 and the header section 23a of the outlet line 23. Valves 24 may be placed in the branch pipes or laterals in both stages to permit disconnection of any of the compressors from the system, as well as to provide means for throttling the gas flow during the making of pulsation determinations, as later explained.

It will be understood that vibration of the conduit, i. e. the gas lines, headers and laterals, may occur at any location in the system at either or both the suction and discharge sides of the stages, and that such vibrations may be coextensive with, or localized with relation to, a given run of piping or conduit. As illustrative, excessive vibrations may be found to occur in all or a portion of the piping both of the inlet line 13, its header 13a and the laterals 14. The preferred procedure for determining the pulsating flow characteristics of the gas (the pulsations of course being created by the compressors) is to make such determinations in either or both the inlet line 13 and its header 13a, and at least one of the laterals 14. For this purpose valve connections 25 may be made (where they do not already exist) with line 13 and one of the laterals 14 as at locations or stations $A_1$ or $A_2$ to permit application to the connections of suitable gas pressure recording instruments, for example of the known electronic pick-up type capable of indicating or measuring, and if desired recording, the frequency, magnitude and other characteristics of the pulsations, with reference to such conditions as the base or static gas pressure in the line. Where the compressors 12 have the same operating characteristics, it may be necessary to make pulsation and vibration measurements within only one of the laterals 14. The information thus obtained indicates the magnitude and characteristics of the energy that may affect the system at the suction side of the compressors by reason of the pulsating flow induced by the compressor operation and under an existing condition which may be regarded as involving an initial degree of restriction of the gas flow in passing through the pipe.

Either before or following such gas pulsation measurements, and while the gas flow conditions remain the same, measurements are made to determine the magnitude of bodily vibrations of the piping. Such determinations are made by the application of vibration indicating or measuring meters of any suitable known type, directly to the conduit preferably at the same stations $A_1$ and $A_2$ as the pulsation measurements are made, or to such other portions of the piping or connections therewith, that may be subjected to the same degrees of vibration. From such measurements may be determined that the piping is subjected to vibration throughout an extended course, or only locally within that course. Similarly, as a result of the gas pulsation measurements, it may be determined that the pulsations are of the same or different characteristics at different locations in the system.

After the described determinations are made during a given pulsating flow condition of the gas, valves 24 in the laterals 14 may be throttled or closed partially to produce a pressure drop across them. As a consequence, the pressure pulsations in the intake piping system may be reduced as much as or greater than 50 percent. The first described pulsations and vibration measurements at the stations $A_1$ and $A_2$ are repeated with the gas streams thus throttled in the laterals and the pulsations reduced. If then the reduction in bodily vibration of the conduit is found to be reduced in proportion to the diminution of the pulsations it is established that the vibration was caused by the gas pulsation. If the pipe vibration is not affected by the pulsation reduction, or is not affected thereby to a substantial degree, then it is established that the vibration is caused by a different effect, such as by transmission from the engine units driving the compressors.

Where the gas pulsations are found to cause the vibrations, the system may be stabilized both with respect to the flow condition of the gas and the physical condition of the piping, by the installation of one or more pulsation dampeners, for example of the general type disclosed in the Stephens Patent No. 2,405,100, issued July 30, 1946, on "Pulsation Elimination in Gas Lines," and particularly of the unit construction disclosed in a copending Stephens application Ser. No. 546,647, filed July 26, 1944, now abandoned, on "Gas Pulsation Dampening Apparatus." Ordinarily it is preferred to install the dampeners in the laterals 14. Thus, after their necessity has been determined, pulsation dampeners diagrammatically indicated at 27 in Fig. 2 may be installed in the intake branch lines 14, the effect of the dampeners being to substantially reduce or eliminate transmission of pulsations from the compressors through them.

Whereas for purposes of description, specific reference has been had only to the making of measurements and dampener installations in the first compressor stage intake system, it will be understood that similar tests and installations may be made with respect to the discharge side and to either or both suction and discharge sides of the second stage. Thus we have indicated stations $A_3$ to $A_8$ at which pulsation and vibration determinations may be made in the manner previously explained, and have indicated with reference to Fig. 2, that the dampeners 27 may be installed at either or both sides of an individual compressor.

The act of throttling one or more valves during the process of analyzing vibratory conditions in a compressor plant is performed only when such a step is feasible and, while desirable, is not always an essential step in the analysis. Conditions are often encountered which make the act difficult or impossible, and when such conditions arise the step is eliminated from the procedure. The analysis in such a case is somewhat more difficult, but is still possible; since the physical characteristics of the pulse wave measured in the pipe can be used successfully for the purpose.

The pulse wave as produced by a recording instrument will also show vibration tendencies which are not directly determinable in the vibration measurements. The shape of the individual wave segments indicates the effect which the pulses will have on the piping and associated equipment in the plant. For example, a steep wave front will produce a heavy shock in the piping, and great consequent damage, even at a relatively low amplitude. The "beating" of two or more compressor cylinders will produce long period "beats" (addition and subtraction) of the pulses, and these are especially dangerous to heavy equipment, such as scrubbers, treating columns, etc. This information comes directly from the measurement and recording of pressure waves versus time in the gas within the pipe. At the same time other pertinent data concerning the frequency of the pulse may be secured. These data are then applied directly to the design of pulsation dampeners.

The word "vibration" as used in this application is broadly defined to include such vibratory characteristics as "displacement" (or distance of motion), "velocity" (or rate of movement), and acceleration (or rate of change of velocity). The latter is the most commonly used, since it is proportional to the energy expended in the movement of the member under test; while the first shows the physical displacement occurring in that member.

The equipment used for recording and measuring the pulses in the gas stream may be of any appropriate type, as for example the kind diagrammatically illustrated in Fig. 3. We may use any suitable device or pressure pick-up 30 which is responsive to the fluctuations in the gas (pulses) and which will convert them to equivalent electrical pulses. These electrical pulses may be proportional to the displacement velocity or acceleration of the pulse wave, depending on the type of responsive device used, and if it is necessary to convert from one form of electrical pulse to another, an integrating or differentiating device 31 must be used in conjunction with the device. The second part of the equipment is an amplifier 32, which increases the power of the electrical pulse to a level which will activate an indicator or recorder 33. The latter may consist of a meter, a cathode ray oscilloscope, a photographic oscillograph, or a direct inking oscillograph. Thus the original pulse wave may be indicated on a meter or may be recorded either temporarily or permanently for later study.

As shown in Fig. 3 the pipe vibration determining apparatus is essentially similar to that for determination of the gas pulsations. The pipe vibration is transmitted to an appropriate pick-up which optionally is connected to the integrator and differentiator, and with an amplifier, the output of which goes to an indicator or recorder. As customary in such apparatus, it may be desirable to interpose a frequency analyzer between the amplifier and recorder.

As illustrative of known pulsation and vibration indicating and recording apparatus of this character, we may cite the instruments manufactured by the Brush Development Company of Cleveland, Ohio, and General Radio Company of Cambridge, Massachusetts. The gas pulsation determining apparatus may consist of a Brush crystal pressure pick-up, model TC-2 (Brush technical bulletin 281): the pick-up may feed into a Brush model OA1 amplifier which in turn feeds into a Brush direct inking oscillograph (Brush technical bulletin 551). Suitable pipe vibration determining apparatus is described in the General Radio Company "Noise Primer" (copyright in 1943) and may include that company's type 759-P35 vibration pick-up using type 7611-A vibration meter which is inclusive of an amplifier and indicating meter. In place of a meter may be used the aforementioned Brush inking oscillograph. If it is desired to make frequency measurement, the General Radio 762-A vibration analyzer may be employed.

We claim:

1. The method of determining the source of vibrations of a pipe conducting gas having pulsating flow, that includes restricting to different degrees the gas flow in said pipe to vary the amplitudes of the gas pulsations and alter vibrations of the pipe due to the gas pulsations, measuring the relative amplitudes of the gas pulsations while the gas flow is so differentially restricted and determining the vibrative condition of the pipe both before and after so restricting the gas flow.

2. For determining the source of vibrations in a compressor conduit system conducting pulsating gas and comprising gas conduit including a header pipe, and a plurality of branch pipes connecting gas compressors with the header; the method that includes restricting to different degrees the gas flow at a selected location in the system to vary the amplitude of the gas pulsations and alter vibrations of the conduit due to the gas pulsations, measuring the different amplitudes of the gas pulsations with reference to the static pressure of the gas while the gas flow is so differentially restricted and determining the vibrative condition of the pipe both before and after so restricting the gas flow.

3. For determining the source of vibrations in a compressor conduit system conducting pulsating gas and comprising gas conduit including a header pipe, and a plurality of branch pipes connecting gas compressors with the header; the method that includes restricting to different degrees the gas flow in one of said branch pipes to vary the amplitude of the gas pulsations and alter vibrations of the conduit due to the gas pulsations, measuring the different amplitudes of the gas pulsations in said one of the branch pipes with reference to the static pressure of the gas and determining the vibrative condition of the pipe both before and after so restricting the gas flow.

4. For determining the source of vibrations in a compressor conduit system conducting pulsating gas and comprising gas conduit including a header, and a plurality of branch pipes connecting gas compressors with the header; the method that includes measuring the amplitude of pulsations of the gas flow in said system with reference to the static pressure of the gas while restricting the gas flow to different degrees with resultant variation of the amplitude of the pulsations being measured, and measuring the bodily vibrations of the conduit while the gas pulsations are so varied.

5. For determining the source of vibrations in a compressor conduit system conducting pulsating gas and comprising gas conduit including a header, and a plurality of branch pipes connecting gas compressors with the header; the method that includes measuring the amplitude of pulsations of the gas flow in said system with reference to the static pressure of the gas while restricting the gas flow to different degrees with resultant variation of the amplitude of the pulsations being measured, and measuring the bodily vibrations of the conduit while the gas pulsations are so varied at substantially the same location that the pulsating flow measurement is made.

6. for determining the source of vibrations in a compressor conduit system conducting pulsating gas and comprising gas conduit including a header, and a plurality of branch pipes connecting gas compressors with the header; the method that includes measuring the amplitude of pulsations of the gas flow in said system with reference to the static pressure of the gas at locations in said conduit including a location in at least one of said branch pipes while restricting the gas flow to different degrees with resultant variation of the amplitude of the pulsations being measured, and measuring the bodily vibrations of the conduit while the gas pulsation amplitudes are so varied at substantially the same locations that the pulsating flow measurements are made.

IRA C. BECHTOLD.
FOSTER M. STEPHENS.
CHARLES NEWMAN.

REFERENCES CITED

The following references are of record in the file of this patent:

UNITED STATES PATENTS

| Number | Name | Date |
| --- | --- | --- |
| 1,522,986 | Taylor | Jan. 13, 1925 |
| 2,398,372 | Green | Apr. 16, 1946 |